United States Patent [19]

Iwasa et al.

[11] Patent Number: 4,870,334
[45] Date of Patent: Sep. 26, 1989

[54] MOTOR CONTROL APPARATUS

[75] Inventors: Masao Iwasa, Chiba; Yasutami Kito, Aichi; Masayuki Mori, Tsushima, all of Japan

[73] Assignee: Otis Elevator Company, Farmington, Conn.

[21] Appl. No.: 196,197

[22] PCT Filed: Aug. 21, 1987

[86] PCT No.: PCT/JP87/00622
§ 371 Date: Jun. 6, 1988
§ 102(e) Date: Jun. 6, 1988

[87] PCT Pub. No.: WO88/01449
PCT Pub. Date: Feb. 25, 1988

[30] Foreign Application Priority Data

Aug. 22, 1986 [JP] Japan ................. 61-197568

[51] Int. Cl.⁴ ............................................... H02P 7/42
[52] U.S. Cl. ...................................... 318/432; 318/811; 318/806; 187/119
[58] Field of Search ................ 187/115, 119; 318/811, 318/798, 806, 610, 432, 434

[56] References Cited

U.S. PATENT DOCUMENTS

| | | | |
|---|---|---|---|
| 3,887,853 | 6/1975 | Klein et al. | 318/801 |
| 3,916,279 | 10/1975 | Kawano et al. | 318/430 |
| 4,030,570 | 6/1977 | Caputo | 187/115 |
| 4,163,279 | 7/1979 | Kubota | 318/610 |
| 4,336,594 | 6/1982 | Masuzawa et al. | 318/610 |
| 4,437,051 | 3/1984 | Muto et al. | 318/811 |
| 4,456,868 | 6/1984 | Yamamura et al. | 318/880 |
| 4,623,042 | 11/1986 | Kamiake | 187/119 |
| 4,625,834 | 12/1986 | Tanahashi | 187/119 |

FOREIGN PATENT DOCUMENTS 59-201689 4/1983 Japan.
60-207485 10/1985 Japan.

Primary Examiner—David Smith, Jr.
Attorney, Agent, or Firm—Robert E. Greenstein; Francis J. Maguire

[57] ABSTRACT

An apparatus for controlling an adjustable-speed electric motor. The actual motor speed is sensed and compared with a commanded motor speed. A speed error signal, which depends on the difference between the actual and desired values of motor speed, is derived and applied to a proportional-plus-integral control circuit which converts it into a first torque command signal. The speed command signal is converted into a second torque command signal proportional to the rate of change of the speed command signal. The second torque command signal is added to the first torque command signal to provide a torque command signal. A control circuit responds to the torque command signal by controlling the operation of the motor in accordance with the torque command signal.

8 Claims, 2 Drawing Sheets

MOTOR CONTROL APPARATUS

BACKGROUND OF THE INVENTION

This invention relates to an apparatus for controlling an adjustable-speed electric motor.

Electric power converters or inverters have been employed for the application of adjustable-speed drives using alternating current motors. A typical converter includes a direct current (DC) rectifier for rectifying three-phase AC input voltage and for supplying the resulting direct current (DC) bus potential to an inverter. The inverter comprises a plurality of pairs of series-connected switching elements to generate an adjustable frequency output. In many applications, such a frequency adjustment is effected through a control circuit which employs a pulse width modulation (PWM) control technique in producing variable frequency gating pulses to periodically switch the respective switching elements so as to operate the motor at a variable speed. The motor can be propelled (motoring mode) or retarded (braking mode) as desired by appropriately varying the frequency and the amplitude of the excitation that the inverter applies to the motor.

The actual motor speed is sensed and compared with a commanded motor speed. An speed error signal, which depends on the difference between the actual and desired values of motor speed, is derived and applied to a proportional-plus-integral control circuit which converts it into a torque command signal. The control circuit responds to the torque command signal by controlling the operation of the inverter so as to vary, as a function of the torque command signal, the amplitude of the voltages supplied from the inverter to the motor.

One problem occurs where the motor is coupled to drive a mechanical load having elastic elements. For example, an elevator has an elevator rope, springs, rubber cushions and other elastic elements for providing improved passenger's comfort and vibration insulation. In such a case, the control circuit tends to resonate with the mechanical load. This tendency neutralize any attempt to increase the response time of the control circuit with respect to commanded motor speed changes.

SUMMARY OF THE INVENTION

Therefore, one main object of the invention is to provide an improved motor control apparatus having a rapid response rate with respect to commanded motor speed changes without any influence of its resonance with the mechanical load driven by the motor.

There is provided, in accordance with the invention, an apparatus for controlling an adjustable speed electric motor. The apparatus includes a motor drive circuit for applying power to drive the motor, and a control circuit responsive to a torque command signal for controlling the operation of the motor drive circuit so as to vary the power as a function of the torque command signal. The control circuit includes a speed sensor sensitive to motor rotation speed for producing a speed feedback signal indicative of a sensed speed of rotation of the motor, a source for producing a speed command signal indicative of a desired motor speed, a first summing circuit for summing the speed feedback and command signals to provide a speed error signal indicative of the difference between the sensed and desired motor speeds, a proportional-plus-integral amplifier connected to the first summing circuit for converting the speed error signal into a corresponding first torque command signal, a second torque command signal generator connected to the source for converting the speed command signal into a corresponding second torque command signal proportional to the rate of change of the speed command signal, and a second summing circuit for summing the first and second torque command signals to provide the torque command signal.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
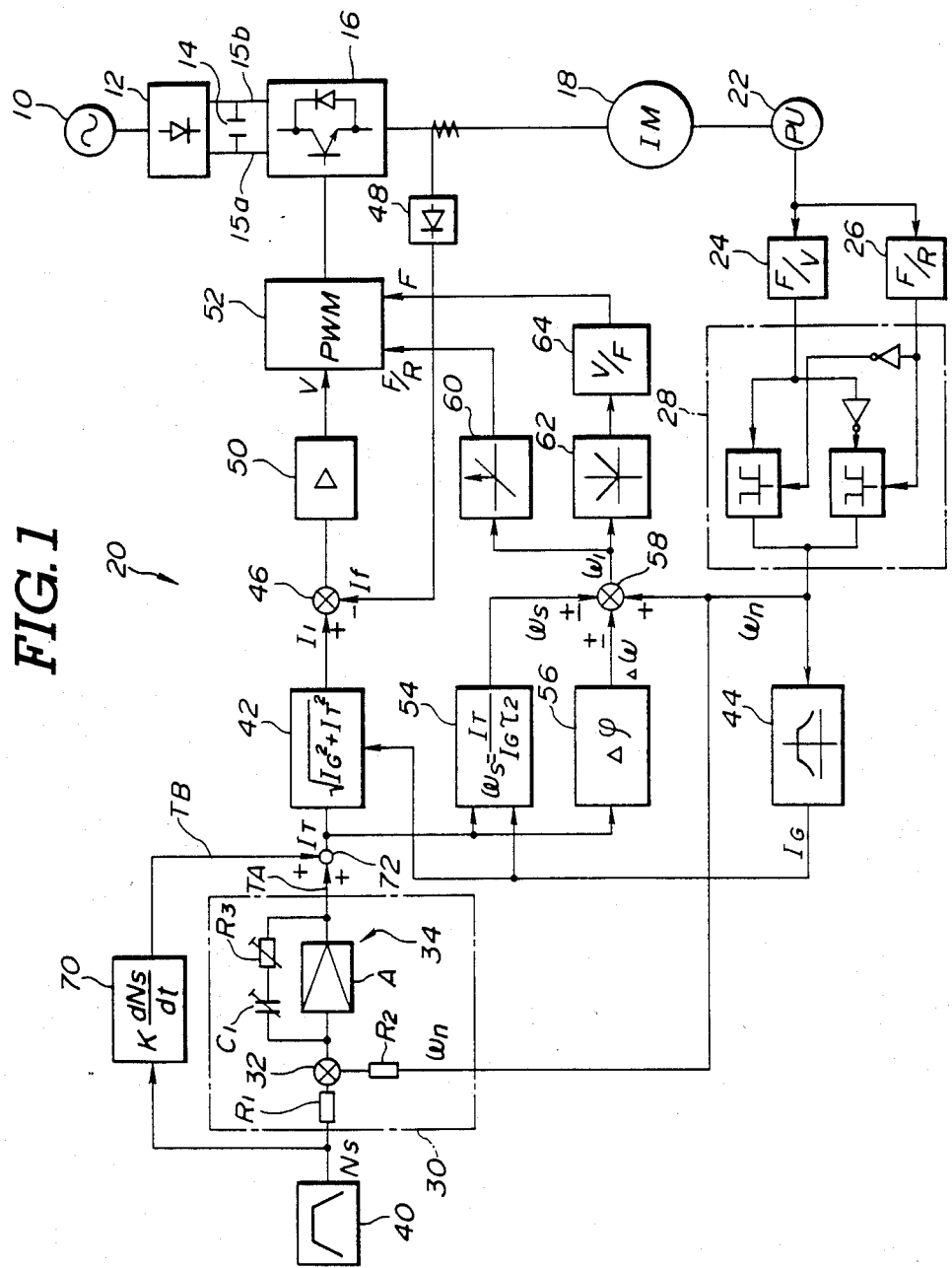
FIG. 1 is a schematic block diagram showing one embodiment of a motor control apparatus made in accordance with the invention.

With reference now to the drawings, and particularly to FIG. 1, an adjustable speed motor drive is shown as comprising a converter system 12 which receives electric power from a suitable AC power source 10. The converter system 12 includes a power rectifier which is operative to convert alternating voltage to unipolarity voltage for energizing a DC link shown as the relatively positive conductor 15a and the relatively negative conductor 15b. The DC link is spanned by a capacitor 14 which smoothes the rectified power. The unipolarity voltage across the smoothing capacitor 14 is applied to a power inverter 16. The inverter 16 includes a plurality of parallel pairs of series-connected switching elements arranged and controlled to convert the DC input power into AC output power having adjustable frequency and voltage magnitude. For this purpose, each of the switching elements has its controlled electrode coupled to a control circuit 20 which will supply the switching elements with cyclic gate pulses to turn on the switching elements in a predetermined sequence and at a desired frequency. The AC output is supplied to a three-phase induction motor 18 through three output conductors, one of which is illustrated in FIG. 1. The induction motor 18 has three-phase stator windings which are energized by the output of the inverter 16 and a rotor coupled to drive a mechanical load such as an elevator.

The induction motor 18 can be propelled (motoring mode) or retarded (braking mode) as desired by appropriately varying the frequency and the amplitude of the excitation that the inverter 16 applies to the induction motor 18. For this purpose, the control circuit 20 regulates and controls the operation of the inverter 16 in programmed response to a plurality of input signals which may comprise a signal representing the desired motor speed and a feedback signal representative of the actual motor speed. The control circuit 20 utilizes a pulse width modulation (PWM) control technique to produce gating pulses so as to periodically switch the respective power transistors of the inverter 16 in accordance with a speed pattern programmed into the control circuit 20.

A magnetic pickup transducer 22 produces a series of motor rotation electrical pulses of a repetition rate directly proportional to motor speed. These electrical pulses are supplied to a frequency-to-voltage converter 24 and also to a forward-reverse detector 26. The frequency-to-voltage converter 24 converts the input pulse signal into a voltage signal corresponding to the speed of rotation of the induction motor 18 and supplies the resulting voltage signal to a speed feedback signal generator 28. The forward-reverse detector 26 detects the direction of rotation of the induction motor 18 to produce a low-level signal, thereby causing the speed feedback signal generator 28 to produce a speed feedback signal $\omega n$ which corresponds to the voltage signal fed thereto from the frequency-to-voltage converter 24 when the induction motor 18 is rotating in a forward direction and a high-level signal, thereby causing the speed feedback signal generator 28 to produce a speed feedback signal $\omega n$ which corresponds to the result of inversion of the voltage signal fed thereto from the frequency-to-voltage converter 24 when the induction motor 18 is rotating in a reverse direction.

A speed control circuit, generally designated by the numeral 30, includes a summing circuit 32 which receives a speed command signal Ns through a resistor R1 from a speed pattern generator 40 and a speed feedback signal $\omega n$ through a resistor R2 from the speed feedback signal generator 28. The values of the resistors R1 and R2 are selected to provide an appropriate weight ratio of the speed command signal Ns with respect to the speed feedback signal $\omega n$. The summing circuit 32 derives a speed error signal which depends on the difference, if any, between the actual and desired values of motor speed. The speed error signal is supplied to a proportional-plus-integral control circuit 34 comprised of an amplifier A, a proportional control element R3 and an integral control element C1. The proportional-plus-integral control circuit 32 converts the speed error signal into a corresponding torque command signal $I_T$ which is supplied to a primary current calculation circuit 42.

The speed feedback signal $\omega n$ is also supplied to an excitation current calculation circuit 44 which calculates a required excitation current as a function of the speed feedback signal $\omega n$ and produces an excitation current command signal $I_G$ representative of the calculated excitation current. The excitation current command signal $I_G$ is supplied to the primary current calculation circuit 42 which calculates a required primary current $I_1$ as $I_1 = \sqrt{I_G^2 + I_T^2}$ where $I_G$ is the required excitation current calculated in the calculation circuit 44 and $I_T$ is the current required to obtain the required torque determined in the speed control circuit 30. The calculated primary current command signal $I_1$ is supplied to a summing circuit 46 which receives another input $I_f$ from a current detector 48. The current detector 48 senses the primary current supplied from the inverter 16 to the induction motor 18 and produces a primary current feedback signal $I_f$. The summing circuit 46 derives a primary current error signal which depends on the difference between the actual and desired values of motor primary current. The primary current error signal is supplied to a proportional-plus-integral control circuit 50 which converts the primary current error signal into a corresponding inverter output voltage command signal V which is supplied to a PWM waveform generator 52.

The torque command signal $I_T$ is also supplied to a slip calculation circuit 54 which receives another input $I_G$ from the excitation current calculation circuit 44. The slip calculation circuit 54 calculates the slip frequency $\omega s$ as $\omega s = I_T/(I_G \times \tau 2)$ where $\tau 2$ is the secondary time constant of the induction motor 18. A phase angle calculation circuit 56 receives an input $I_T$ from the speed control circuit 30. The phase angle calculated circuit 56 detects a change $\Delta I_T$ of the torque command signal $I_T$ and calculates a frequency correction factor $\Delta \omega$ corresponding to the inverter phase angle change as a function of the detected torque command signal change $\Delta I_T$. The calculated values $\omega s$ and $\Delta \omega$ are fed to a summing circuit 58 which receives another input $\omega n$ from the speed feedback signal generator 28. The summing circuit 58 sums these input signals $\omega s$, $\Delta \omega$ and $\omega n$ and produce a primary frequency command signal $\omega 1$. The primary frequency command signal $\omega 1$ is applied to a zero crossing detector 60 which produces a forward-reverse command signal F/R to the PWM waveform generator 52. The primary frequency command signal $\omega 1$ is also applied from the summing circuit 58 to an absolute value conversion circuit 62 and then to a voltage-to-frequency converter 64 which produces a fundamental frequency command signal F having phase and frequency information. The frequency command signal F is supplied to the PWM waveform generator 52.

The waveform generator 52 responds to the voltage command signal V and the frequency command signal F by controlling the operation of the switching elements of the inverter 16 so as to vary, as a function of the voltage command signal V, the amplitude of the fundamental components of the three-phase alternating voltages that the inverter 16 applies to the induction motor 18 and to vary, as a function of the frequency command signal F. the frequency of the fundamental components of the three-phase alternating voltages that the inverter 16 applies to the induction motor 18. The forward-reverse command signal will determine the sequence of operation of the switching elements of the inverter 16 so as to drive the induction motor 18 in a commanded direction.

The control circuit 20 also includes an open loop circuit including a second torque command signal generator 70 which receives an input Ns from the speed pattern generator 40 and produces a second torque command signal TB proportional to the rate of change of the speed command signal Ns. The second torque command signal TB is represented as TB=K×dNs/dt where K is a constant corresponding to the force $GD^2$ of inertia of the mechanical load driven by the induction motor 18 and dNs/dt is the rate of change of the speed command signal Ns. The constant K is selected in such a manner that the second torque command signal has a magnitude corresponding to a torque required to drive the mechanical load, the required torque being determined by the rate of change of the speed command signal Ns and the force $GD^2$ of inertia of the mechanical load. The second torque command signal TB is supplied to a summing circuit 72 where it is added to the output TA of the speed control circuit 30 to provide the torque command signal $I_T$. This open loop circuit permits the speed control circuit 30 to provide a small torque command signal TA required to compensate for a small error which may be caused by mechanical losses produced in the induction motor 18 and the mechanical load and an error produced in selecting the constant K.

Figure 2:
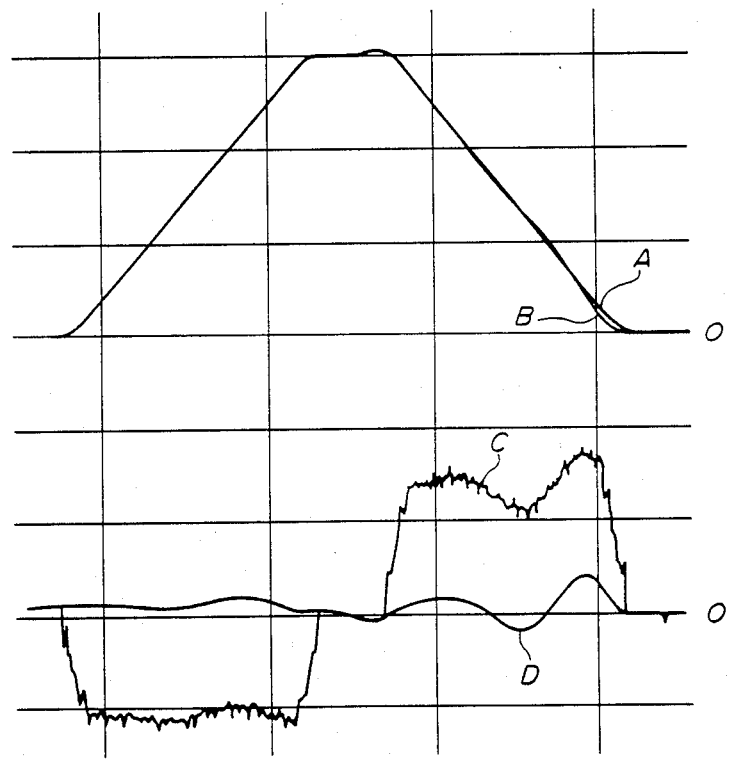
FIG. 2 shows signal waveforms obtained at various points of the control circuit.

Referring to FIG. 2, the operation of the open loop circuit will further be described. The waveform A relates to the speed command signal Ns obtained at the output of the speed pattern generator 40 and the waveform B relates to the speed feedback signal $\omega n$ obtained at the output of the speed feedback signal generator 28. The speed command signal Ns is applied to the second torque command signal generator 70 which converts it into a second torque command signal TB proportional to the rate of change of the speed command signal Ns, as shown by the waveform C of FIG. 2. The speed command signal Ns is also applied to the speed control circuit 30 which converts it into a first torque command signal TA, as shown by the waveform D of FIG. 2. The summing circuit 72 adds the first and second torque command signals TA and TB to produce a torque command signal $I_T$. It can be seen from FIG. 2 that the speed control circuit 30 produces a small torque command signal TA which is enough to compensate for a small error between the torque commanded by the second torque command signal TB and the actual torque required for the induction motor 3, the error being caused mainly by mechanical losses produced in the induction motor 18 and the mechanical load and an error produced in calculating the constant K. It is, therefore, possible to eliminate the resonance problem by minimizing the gain of the speed control circuit 30.

It is apparent from the foregoing that the invention has provided a motor control apparatus which can operates at a rapid response rate with respect to commanded motor speed changes without any influence of its resonance with the mechanical load driven by the motor. This increases the freedom in designing the mechanical load. Since a significant portion of the torque command signal is obtained in an open loop circuit, the operation remains stable against disturbances. The motor control apparatus is advantageous particularly when it is applied to drive a vibratile mechanical load such as an elevator or the like which has such characteristics as:

1. It requires a 100% torque during normal running conditions and additional 100% torque during acceleration or deceleration.

2. Its inertia force GD² remains constant regardless of the number of the passengers in its passenger cage.

3. The rate of change of its speed remains substantially constant during acceleration.

While the invention has been described in conjunction with a specific embodiment thereof, it is evident that many alternatives, modifications and variations will be apparent to those skilled in the art. Accordingly, it is intended to embrace all alternatives, modifications and variations that fall within the scope of the appended claims.

What is claimed is:

1. An apparatus for controlling an adjustable-speed electric motor, including a motor drive circuit for applying power to drive the motor, and a control circuit responsive to a torque command signal for controlling the operation of the motor drive circuit so as to vary the power as a function of the torque command signal, the control circuit including:

a speed sensor sensitive to motor rotation speed for producing a speed feedback signal indicative of a sensed speed of rotation of the motor;

a source for producing a speed command signal indicative of a desired motor speed;

a first summing circuit for summing the speed feedback and command signals to provide a speed error signal indicative of the difference between the sensed and desired motor speeds;

a proportional-plus-integral amplifier connected to the first summing circuit for converting the speed error signal into a corresponding first torque command signal;

a second torque command signal generator connected to the source for converting the speed command signal into a corresponding second torque command signal proportional to the rate of change of the speed command signal; and a second summing circuit for summing the first and second torque command signals to provide the torque command signal.

2. The apparatus as claimed in claim 1, wherein the first summing circuit sums the speed feedback and command signals at a predetermined ratio.

3. The apparatus as claimed in claim 1, wherein the second torque command signal generator generates a second torque command signal represented as $K \times dNs/dt$ where K is a constant corresponding to the inertia force of a mechanical load coupled to the motor and dNs/dt is the rate of change of the speed command signal.

4. The apparatus as claimed in claim 1, wherein the motor is coupled to drive an elastic mechanical load having an inertia force.

5. The apparatus as claimed in claim 4, wherein the second torque command signal generator generates a second torque command signal represented as $K \times dNs/dt$ where K is a constant corresponding to the inertia force of the load and dNs/dt is the rate of change of the speed command signal.

6. The apparatus as claimed in claim 1, wherein the motor is an alternating current motor coupled to drive an elevator having an interia force, and wherein the motor drive circuit includes an inverter having relatively positive and negative DC inputs and a plurality of AC output terminals connected to the alternating current motor for converting unipolarity voltage applied to the input terminals into alternating voltage at the output terminals.

7. The apparatus as claimed in claim 6, wherein the control circuit includes means for converting the torque command signal into a corresponding voltage command signal, and means responsive to the voltage command signal for vary the amplitude of the alternating voltage as a function of the voltage command signal.

8. The apparatus as claimed in claim 7, wherein the second torque command signal generator generates a second torque command signal represented as $K \times dNs/dt$ where K is a constant corresponding to the inertia force of the load and dNs/dt is the rate of change of the speed command signal.

* * * * *